United States Patent
Ezrielev et al.

(10) Patent No.: US 12,541,595 B2
(45) Date of Patent: Feb. 3, 2026

(54) RANSOMWARE DETECTION VIA DETECTING SYSTEM CALLS PATTERN IN ENCRYPTION PHASE

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 219 days.

(21) Appl. No.: 18/194,725

(22) Filed: Apr. 3, 2023

(65) Prior Publication Data

US 2024/0330461 A1    Oct. 3, 2024

(51) Int. Cl.
*G06F 21/00* (2013.01)
*G06F 21/56* (2013.01)

(52) U.S. Cl.
CPC .......... *G06F 21/566* (2013.01); *G06F 21/565* (2013.01); *G06F 2221/034* (2013.01)

(58) Field of Classification Search
CPC . G06F 2221/034; G06F 21/565; G06F 21/566
USPC .......................................................... 726/23
See application file for complete search history.

(56) References Cited

U.S. PATENT DOCUMENTS

| | | | |
|---|---|---|---|
| 10,505,960 B2* | 12/2019 | Kong | H04L 63/145 |
| 2014/0282814 A1* | 9/2014 | Barney | G06F 21/554 |
| | | | 726/1 |
| 2018/0082060 A1* | 3/2018 | Tolpin | G06F 21/554 |
| 2023/0229761 A1* | 7/2023 | Laplante | G06F 21/566 |
| | | | 726/22 |
| 2024/0346143 A1* | 10/2024 | Ezrielev | G06F 21/53 |

FOREIGN PATENT DOCUMENTS

| | | | | |
|---|---|---|---|---|
| KR | 20200067044 A | * | 6/2020 | G06N 3/044 |
| WO | WO-2022221202 A1 | * | 10/2022 | G06F 21/552 |

* cited by examiner

*Primary Examiner* — Josnel Jeudy
(74) *Attorney, Agent, or Firm* — Workman Nydegger (57) ABSTRACT

System calls performed by processes in a computing system are monitored and scored. The score is maintained over a time window. When the score exceeds a threshold score for a process in the time window, the process is determined to be a malware process and a protective operation is performed.

18 Claims, 8 Drawing Sheets

| Proccess | Call Type | Timestamp | File Type | File | Score |
|---|---|---|---|---|---|
| Malware | Open | T1 | Valuable | X1 | 5 |
| | Rename | T2 | Valuable | X1-1 | 6 |
| | Write | T3 | Valuable | X1-1 | 7 |
| | Close | T4 | Valuable | X1-1 | 8 |
| | Open | T6 | Valuable | Y1 | 12 |
| | Read | T7 | Valuable | Y1 | 13 |
| | Write | T8 | Valuable | Y1 | 14 |
| | Close | T9 | Valuable | Y1 | 15 |

Figure 5A

| Process | Call Type | Timestamp | File Type | File | Score | |
|---|---|---|---|---|---|---|
| Malware | Open | T1 | Valuable | X1 | | |
| | Rename | T2 | Valuable | X1-1 | | |
| | Read | T3 | Valuable | X1-1 | | |
| | Write | T4 | Valuable | X1-1 | | |
| | Close | T5 | Valuable | X1-1 | 8 | 514 |
| | Open | T6 | Valuable | Y1 | | |
| | Read | T7 | Valuable | Y1 | | |
| | Write | T8 | Valuable | Y1 | | |
| | Close | T9 | Valuable | Y1 | 15 | 516 |

RANSOMWARE DETECTION VIA DETECTING SYSTEM CALLS PATTERN IN ENCRYPTION PHASE

FIELD OF THE INVENTION

Embodiments of the present invention generally relate to a computing forensics system. More particularly, at least some embodiments of the invention relate to systems, hardware, software, computer-readable media, and methods for protecting data from threats including cyber threats.

BACKGROUND

Most entities rely on computing systems. These computing systems include applications and their data. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can usually be quickly resolved. The loss of data (e.g., inability to access the data) due to malware or other cyber threats can be much more problematic.

Malware that infects a production system, for instance, can cause severe problems in the entity's operations as the data may not be accessible. In addition to infecting production systems, malware may also infect backups. Recovering from malware can be complicated, difficult, and costly due to the potentially unknown effects of the malware. Further, the delay associated with recovering the production system may be further delayed when law enforcement or insurance companies are involved.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection systems and data protection operations. More particularly, at least some embodiments of the invention relate to systems, hardware, software, computer-readable media, and methods for detecting and/or responding to malware and other cyber-attacks.

In general, example embodiments of the invention relate to data protection operations including, but not limited to, data protection operations, backup operations, snapshot operations, restore/recover operations, point-in-time backup/recover operations, malware response operations, malware evaluation operations, malware detection operations or the like or combinations thereof.

The term malware as used herein and by way of example, may refer to ransomware, viruses, rootkits, spyware, adware, trojans, worms, phishing attacks, or other unwanted software or cyber-attacks. Malware may also be referred to as a computing process or application.

Embodiments of the invention relate to a forensic engine, or a forensics kit configured to evaluate, detect and/or respond to malware. When malware is detected in a production system (or in a backup), the forensic engine may perform a snapshot or other backup of the production system. The snapshot, which includes the malware, is an infected snapshot and may be deployed to a forensics environment such that the forensic engine can attempt to learn how the malware operates, how the production system was infected, or the like. U.S. Ser. No. 17/937,882 filed Oct. 4, 2022, which is incorporated by reference in its entirety, relates to a forensic engine or system. The forensic engine allows the malware to operate in an observed manner such that operational characteristics of the malware can be learned and evaluated. This may include determining how and when files are altered (e.g., deleted, changed, encrypted), how and where data is sent by the malware, how the malware spreads, how the malware responds to anti-malware software, how the malware tries to avoid detection, how the malware infects backups, and the like.

Embodiments of the invention allow the forensic engine to learn these operational characteristics or other behavior. While learning the operational characteristics or after learning the operational characteristics, the forensic engine may be configured to operate in a proactive manner. For example, the forensic engine can trick or cause the malware to send a response malware back to the malware's source. The forensic engine may also emulate communications of the malware. The forensics engine may be able to mitigate, or reverse damage caused by the malware in the production system.

Figure 1:
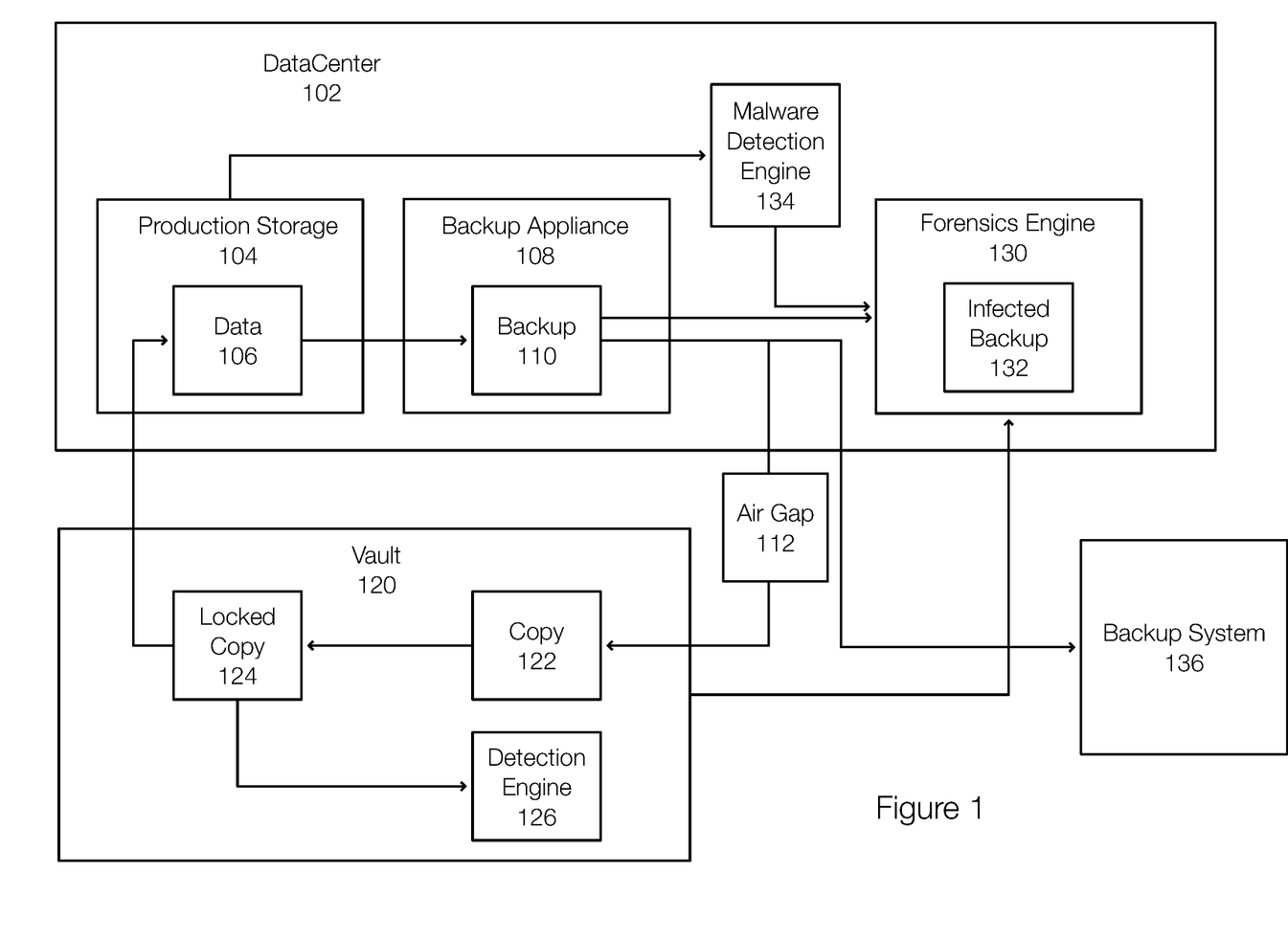
FIG. 1 discloses aspects of a forensic engine or kit configured to perform data protection operations including learning operations performed by a malware and responding to the malware.

FIG. 1 discloses aspects of a forensic engine configured to perform data protection operations including malware related operations. FIG. 1 illustrates a datacenter 102 that includes production storage 104, which stores production data 106. The datacenter 102 may also host applications associated with the data 106. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a datacenter 102, the production storage 104 may be an on-premise storage system, an edge system storage, a cloud-based system or the like or combination thereof. The production storage 104 may include storage devices such as hard disk drives.

A backup appliance 108 is configured to generate and store backups of the data 106 (and/or applications), represented as the backup 110. The backup 110 may be or include a full backup, a synthetic backup, incremental backups, snapshots, or the like. The backup appliance 108 may be a virtual appliance or a physical appliance. The backup appliance 108 may coordinate with other backup appliances at remote locations. This allows backups to be stored remotely.

More generally, the backup appliance 108 may protect data, applications, or the like. The backup appliance 108 may transmit the backup 110 to a vault 120, which may be protected by an air gap 112 controlled by the vault 120. This allows a copy 122 (e.g., a backup) of the data 106 to be stored in the vault 120 only when a connection is available (e.g., the air gap 112 is configured to allow communications). After ingestion into the vault 120, the copy 122 is locked to generate a locked copy 124. The locked copy 124 is immutable in one example. The vault 120 may be created in the datacenter 102 or in another location that is remote from the data 106 and/or the backup appliance 108. In other examples, backups may be stored in storage systems that are not protected by an air gap mechanism. For example, the backup appliance 108 may regularly transmit backups to a backup system 136 in the cloud or other location.

During a recovery operation, the data 106 may be recovered from the locked copy 124 (or other backup in the vault 120) or from the backup system 136. In some examples, the data 106 may be recovered from the copy 122 if necessary. In one example, the backup 110 may be a namespace that is backed up to a namespace in the vault 120. The backup 110 may be transmitted to a namespace in the vault 120 as the copy 122. Next, the copy 122 may be copied to another namespace and retention locked, which results in the locked copy 124.

The air gap 112 may not be required but provides a more secure backup environment. Once the locked copy 124 is generated and retention locked, the immutability is guaranteed in one example. For example, the locked copy 124 is secure from attack vectors that adversely impact backups because the vault 120 may not be accessible, due to the air gap 112, which is controlled from inside the vault 120 in one example.

In one example, the vault 120 may be a target site configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

The production storage 104 (or more generally the production system) may be associated with a malware detection engine 134. When the malware detection engine 134 detects malware in the production storage 104 or in the production system, the malware detection engine 134 may trigger the forensic engine 130 and/or perform other protective operations. The forensic engine 130 may be triggered in another manner or may include the malware detection engine 134.

When triggered, the forensic engine 130 may generate a snapshot (e.g., a point-in-time snapshot) or backup of the production system, which is illustrated as an infected backup 132. The infected backup 132 may be taken from the data 106, may be a PiT copy generated from the backup 110, or the like. In this example, the infected backup 132 may represent different types of backups.

Figure 2:
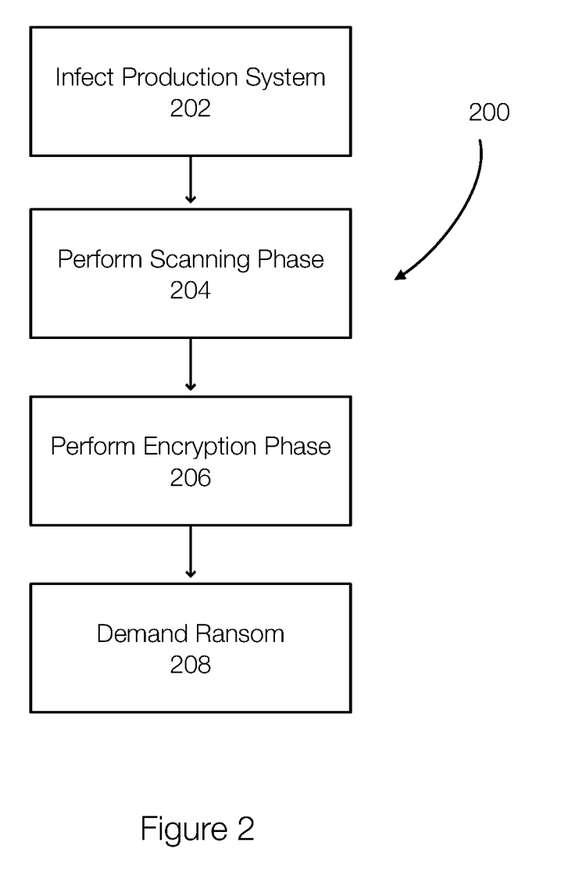
FIG. 2 discloses aspects of operational phases of a malware application or process.

FIG. 2 discloses aspects of malware operations. For example, ransomware is an example of malware that is configured or designed to block/prevent users from accessing their data until a ransom is paid. Ransomware is prevalent and is a significant concern for users everywhere. Embodiments of the invention are directed to detecting malware such as ransomware in real time or near real time in order to prevent or mitigate damage to the production system.

As illustrated in the method 200, ransomware, like other malware, may infect 202 a production system. Malware may gain access to the production system in different manners such as when a user visits an infected website, opens a malicious attachment or email, sends login information to a phishing site, or the like. Once the malware gains access to or infects a production system, the malware may operate in various phases. In a simple example, malware such as ransomware may simply begin encrypting data. This is possible because encryption functionality is often part of an operating system. Thus, the ransomware only needs to access the files, encrypt the files with an attacker-controlled key, and replace the original files with the attacker controlled encrypted files.

Many malware or ransomware variants may be more cautious in selecting files to encrypt or may generate a plan prior to encrypting the data. This may be performed to ensure system stability. More specifically, the malware may perform 204 a scanning phase 204. A scanning phase 204 may allow the malware to identify files that appear to have higher value, select files to encrypt, generate a mapping of files to encrypt, or the like. During this or other phases of operation, some malware may delete backup and shadow copies of files to make recovery without the decryption key more difficult. The scanning phase may also include attempts to infect other computing systems or the like. For example, a malware may gain access to a production data system and spend time trying to access an accounting system or spread to other unrelated computing systems.

In some examples, the files that malware believes to be valuable may not be known. In other words, the manner in which malware quantifies or values files may not be known. However, information may be gleaned from the files encrypted by known malware in other systems. Further, files can be categorized based on different categories. As the malware or suspected malware operates, the type or category can be identified and insight into the operation of the malware can be obtained.

Once the malware has scanned the production system and completed the scanning phase, an encryption phase may be performed 206. The encryption phase may be representative of various forms of attack. In another example, the malware may corrupt files (e.g., partially delete, partially overwrite). As previously stated, this may be performed using an attacker-controlled key and encryption functionality of the operating system. Once the files are encrypted, a ransom may be demanded 208. The malware may encrypt the targeted files or perform other operations in the infected computing system.

The following discussion references files in the context of malware. However, the target of malware can be any type of data such as a database, documents, spreadsheets, emails, applications, system files, objects, segments, or the like.

During the scanning and/or encryption phases of a malware application or process, the malware may perform system calls to access the files or otherwise access the files. The malware may perform or execute the same systems calls repeatedly (e.g., for each file). The accesses or system calls performed in the scanning phase may differ from the accesses or system calls performed during the encryption phase. The system calls in the scanning phase may be performed to discern the content or attributes of the files, which may allow the malware to perform the encryption phase in a targeted manner. This is significant, by way of example, because there is a higher chance of discovery once the malware begins encrypting files. During the encryption phase, additional system calls are performed, which include those necessary to encrypt the files.

Embodiments of the invention may track the system calls or file accesses performed by processes in the computing environment (both user and/or kernel spaces). Using a time window, a score for each process can be determined. Processes that perform the same/similar pattern of system calls to a single file or to multiple files may have a score that is higher than the score of processes than do not exhibit the pattern. As a result, malware can be identified using the score. Generally, when the score exceeds a threshold score, protection actions are performed.

The process of detecting malware based on detecting system call patterns can be further enhanced by tracking and maintaining the estimated value of the files. A computing system may associate each file with a type. For example, if the system believes that malware would target a first file and not target a second file, the first file may be labeled as valuable and the second file is labeled as not valuable or is not labeled. In one example, these labels or types are generated in advance such that the labels exist before the malware beings to operate. This allows a process to be evaluated in the context of file types being accessed with system calls. When a process is associated with performing a pattern of system calls to a specific type of file (e.g., the valuable files), the score may be increased more quickly or in larger amounts. This allows the processes to be tracked with respect to files even in the event that the process deviates from the pattern and performs other system calls such as rename operations.

Embodiments of the invention thus allow malware to be detected and further advantageously allow inline production analysis to be integrated with offline analysis in the vault or other backup system. More specifically, an attack can be stopped/mitigated by detecting access attempts or system call patterns and/or variations thereof.

System calls performed during the scanning phase may be performed to identify attributes of files in a computing system. The attributes allow the malware to determine which files to target and may allow the malware to formulate a plan for encrypting the files. For example, a malware process may read a file to determine or evaluate the contents. The content may include financial data, confidential data, personal data, or the like. These attributes determined from the file and/or its content can relate to the content of the file, metadata of the file, or the like.

Figure 3:
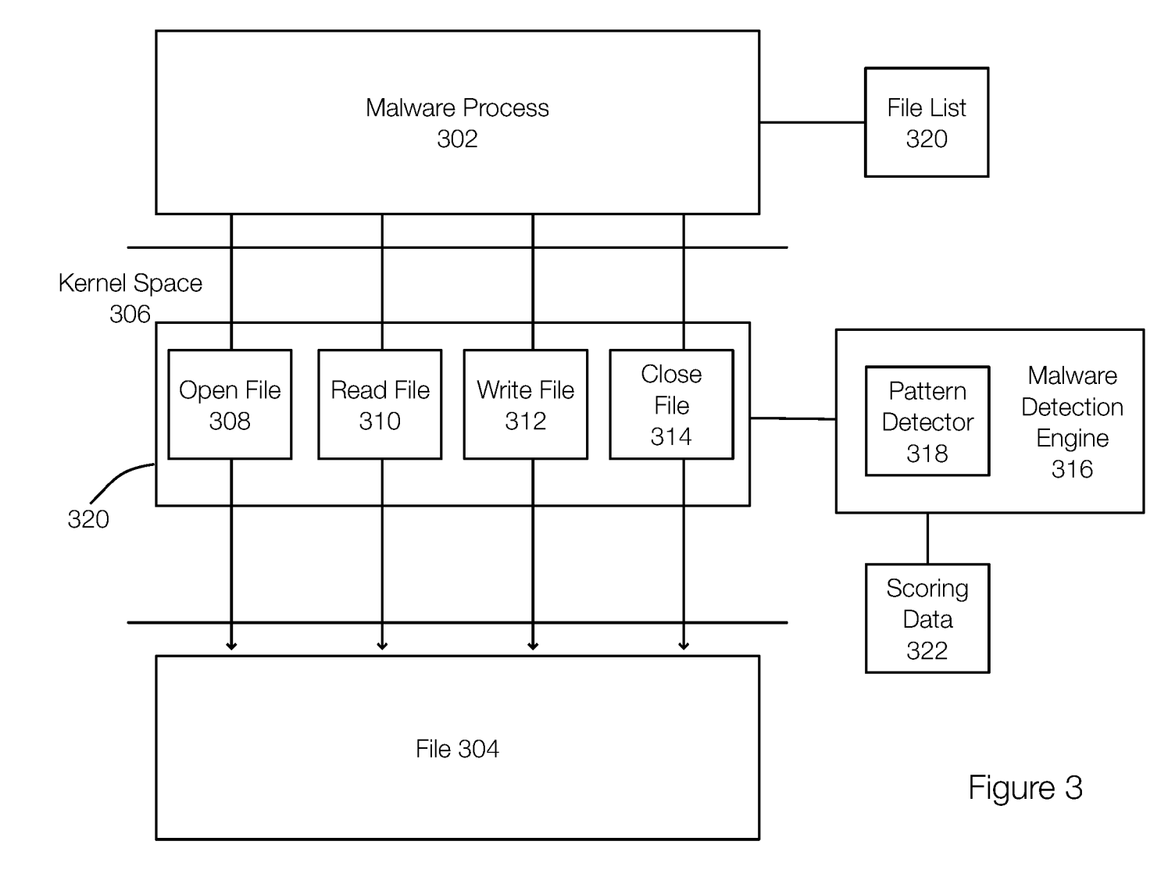
FIG. 3 discloses aspects of detecting malware in a computing system.

FIG. 3 discloses aspects of detecting malware in a computing system. During the scanning phase, a malware process 302 may scan the files of a computing system. As previously stated, this may be performed in order to generate a file list 320 of files to encrypt. The file list 320 may include a mapping of the computing system, a list of files to encrypt first, or other aspects of an encryption operation.

During the encryption phase, a malware process may perform multiple system calls (e.g., calls to the operating system) in a specific order. For example, the malware process 302 may perform the following system calls in order to a file 304: (i) open file 308, (ii) read file 310, (iii) write file 312, and (iv) close file 314. When writing 312 the file, the malware process 302 is writing an encrypted or corrupted file. This pattern 320 of system calls may be performed for each file in the file list 320 (or for each file that the malware process 302 encrypts (or corrupts). The malware detection engine 316 may be configured to detect the malware process 302 based on system call patterns.

The malware detection engine 316 may include a pattern detector 318 that is configured to generate scoring data 322 for processes operating in the computing system. The scoring data may include a score for each of the processes operating in the computing system. When the malware process 302 executes the pattern 320, the score of the malware process 302 is increased in the scoring data 322.

In one example, the scoring data 322 may be based on a moving window, which may be based on time. System calls made within the window contribute to the scores of the relevant processes. The window is the most recent x seconds. The size of the time window may vary and can be set by default (e.g., 1 second, 2 seconds, 10 seconds) or by a user. The score of a process may change (e.g., decrease) as patterns contributing to the score fall out of the window. In one example, however, a history may be maintained such that processes that are close the threshold can be flagged for evaluation, particularly if the score is anomalous (e.g., below a threshold score, but more than one standard deviation away from the mean). This may also indicate that the threshold score may require adjustment.

The pattern detector 318 may also account for a type of file accessed. As previously stated, files in a computing system can be evaluated and assigned a type for malware detection purposes. In a simple example, the malware detection engine may assign files in the computing system as either valuable or not valuable. A file whose type is valuable is believed to be more valuable to the malware process 302. For example, a bank may label files with financial data as valuable and files that contain procedures for exiting the bank in the case of emergency as not valuable.

The label of the file may contribute to the score. Thus, if the malware process 302 is performing the pattern 320 and accessing valuable files, then the score of the malware process 302 in the scoring data 322 is impacted more. A process performing the pattern 320 on files that are not valuable will have a lower score than a process that is performing the pattern 320 on files that are valuable. The types can be expanded to other categories such as medical, personal, financial, confidential, or the like.

In one example, multiple scores may be maintained for each process. The scoring data 322 may include an overall score of a process that does not consider categories. In other words, the overall score may reflect patterns exhibited by a process without regard to type. The scoring data may include a score for each category for each process. Each of these different scores may be associated with a threshold score. Whenever any one of the threshold scores is exceeded, the process is treated as a malware process. The various scores of a process may also be treated collectively (e.g., average, weighted average).

A process that performs the pattern multiple times in succession may achieve a score that is above a threshold score. When the score of a process is greater than the threshold score, the process may be deemed a malware process and protection operations are performed. In other words, a process that repeatedly performs the pattern 320 is more likely to be a malware process.

In another example, the malware detection engine 316 may include a machine learning model. The pattern detector 318 may be a machine learning model. The machine learning model may be trained using typical system calls (e.g., history of system calls, order of system calls) performed by a known malware. This allows the machine learning model to account for pattern variations, attempts to hide the pattern (e.g., by performing other systems calls to break the pattern. The machine learning model may predict whether a process is malware using on a recent history or time series of system calls made by the process.

The malware process 302 may not exhibit the pattern 320 exactly. The malware process 302 may use a different pattern. For example, the malware process 302 may perform a copy operation to move the file, overwrite the previous copy, and/or rename the file. However, the malware may still be detected as the pattern or variations thereof are performed repeatedly by the malware process 302.

Further, the malware detection engine may evaluate the system calls performed by a process to determine whether the pattern can be identified by removing system calls that are not included in the pattern. If the pattern the malware detection engine is searching for is open, read, write, and close and the system calls detected are open, rename, write, and close, the malware detection engine 316 may determine that the core pattern is present and ignore the extra call. In other words, the malware detection engine 316 may have the ability to identify a core pattern that the malware may attempt to hide or obfuscate and adjust the score accordingly. In addition, system calls that change the name of a file do not impact the file type. As a result, scores that are associated with the file type (e.g., valuable) are not impacted by efforts of the malware process to hide their actions in the computing system.

Figure 4:
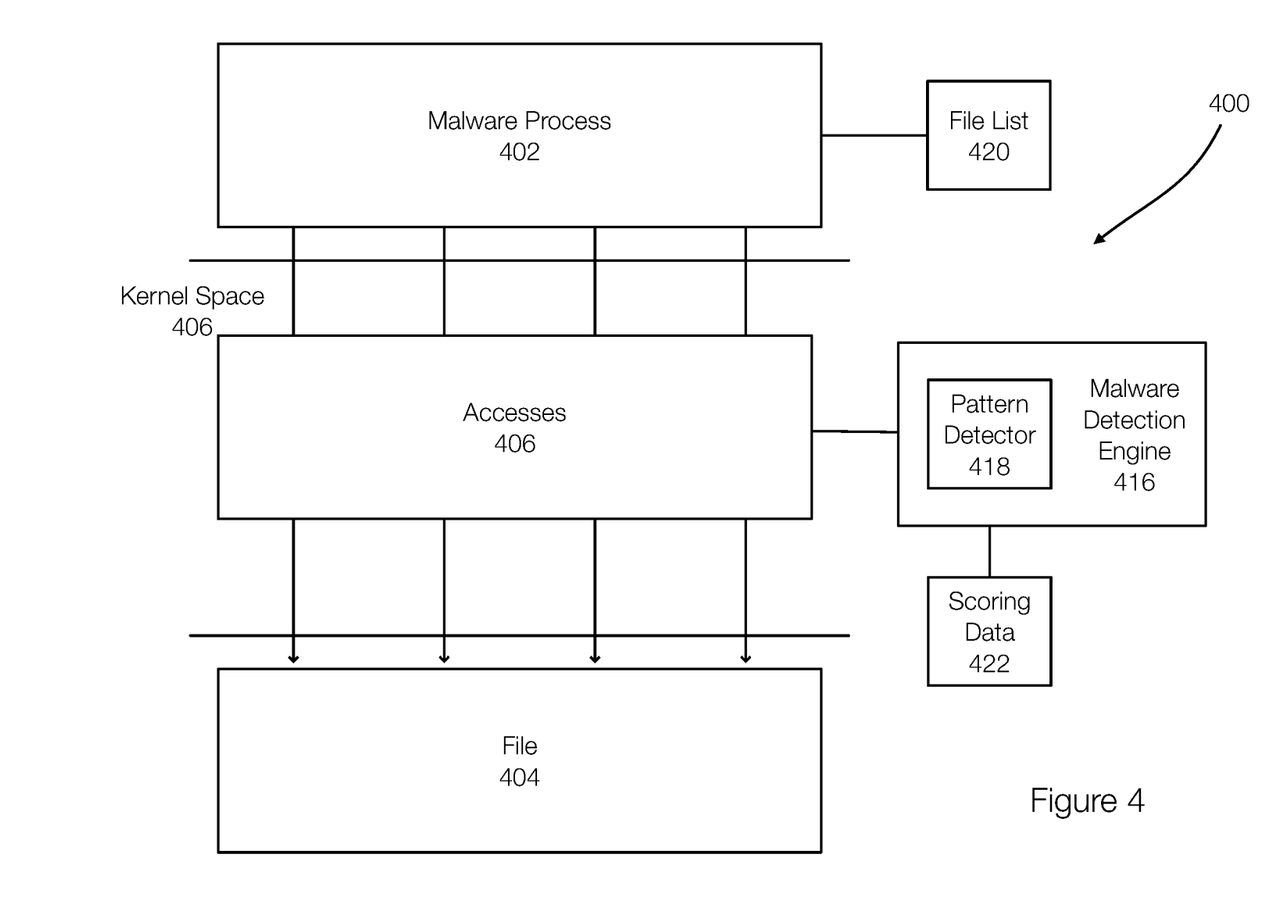
FIG. 4 discloses additional aspects of detecting malware in a computing system.

FIG. 4 discloses additional aspects of detecting malware in a computing system. FIG. 4 illustrates a computing environment 400 that includes a malware detection engine 416 with a pattern detector 418 operating in a kernel space 406. The malware process 402 may also operate in the kernel space 406.

In one example, the malware process 402 may not exhibit a pattern or, more specifically, a consistent pattern. However, the malware detection engine 416 or, more specifically, the pattern detector 418, may be configured to detect the malware process 402 based on accesses 406. In one example, accesses 406 (e.g., any type of system call or other access) to the files such as the file 404 are tracked by the pattern detector 418.

The pattern detector 418 may be configured to access a history of accesses for a given file. This may allow the pattern detector 418 to identify a pattern that has been varied or altered. Alternatively or in addition, the pattern detector 418 may also detect accesses 406 to specific file types. As previously stated, the files may each be associated with a type. The pattern detector 418 may generate a score for an access that is dependent on the type of the file being accessed. The scoring performed by the pattern detector 418 gives higher scores for accesses 406 to files that were likely identified by the malware process 402 as targets or as valuable (worth encrypting) during the scanning phase. A pattern of accesses to only files of a particular type may result in an increased score. Thus, the pattern detector 418 is configured to evaluate access patterns of different types such as system call patterns, file type patterns, or the like. The pattern detector 418 may also be able to account for pattern variations. Another pattern relates to system calls to different files, which suggests that the process is impacting multiple files in the computing system and may be malicious.

Figure 5A:
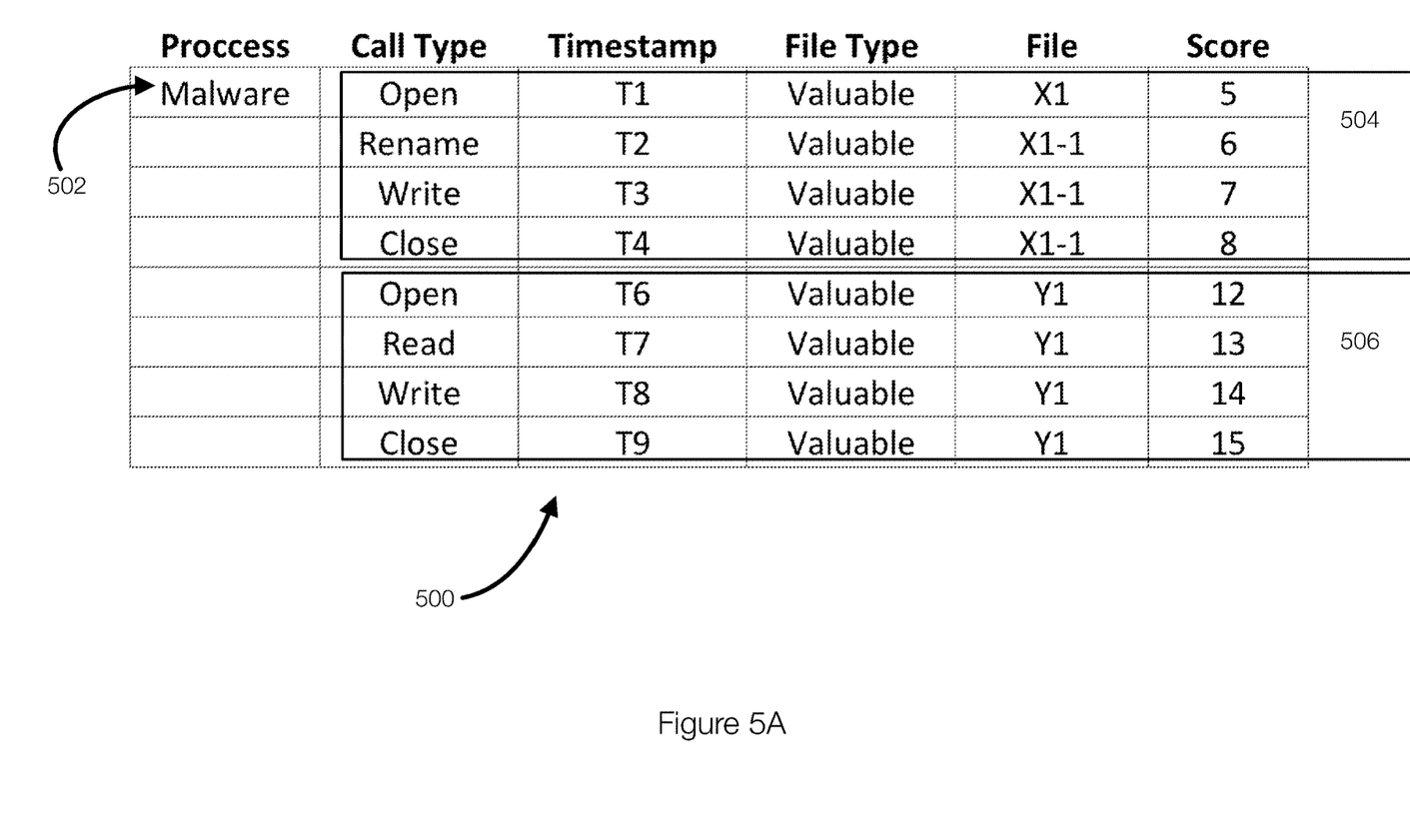
FIG. 5A discloses aspects of scoring data used in detecting malware in a computing system.

FIG. 5A discloses aspects of scoring data. FIG. 5A illustrates an example of scoring data, such as the scoring data 422. The table illustrates that the pattern detector 418 gives a score for each access performed by a process. Accesses are tracked by process and the table 500 illustrates accesses for a malware 502 process. The accesses are also tracked with respect to files. The table 500 may include accesses such as system calls relevant to a particular window of time. The timestamps of the accesses determines whether an access is included in or dropped from a window in one example.

The table illustrates that the malware process 502 performs varied patterns. In this example, the pattern 504 differs from the pattern 506. The table 500 illustrates that the scoring data 422 can account for name changes or other calls. As illustrated in the pattern 504, the change of name is tracked such that actions performed with respect of a particular file and/or type can be determined and tracked.

The table 500 illustrates that as a file is accessed, the score for the process is increased. Each access or each type of system call may be associated with a different value. If the table 500 indicates that a process is repeatedly writing to different files, the score for that process may be increased at a faster rate.

The file type (e.g., valuable, not valuable) may also impact the score. If the malware process 502 is performing system calls only with respect to valuable files, the score will reflect this type of action. Thus, files more likely to be selected during the scanning phase will reward the score of the process with a greater value. When the score exceeds a threshold score, the process 502 is blocked and an alert is generated. Other protective actions, such as performing a backup or snapshot, may be performed.

FIG. 5A illustrates that the malware detection engine is configured to track files in a manner that is not impacted by changes caused by malware that are not indicative of value. For example, changing the name or other characteristic or metadata of a file does not impact the tracking performed by the malware detection engine. The malware detection engine is able to track accesses and detect malware regardless of changes made to the file by malware. FIG. 5A illustrates an example of adjusting the score of the process for each access. In another example, the score may be adjusted only when a pattern is detected.

Figure 5B:
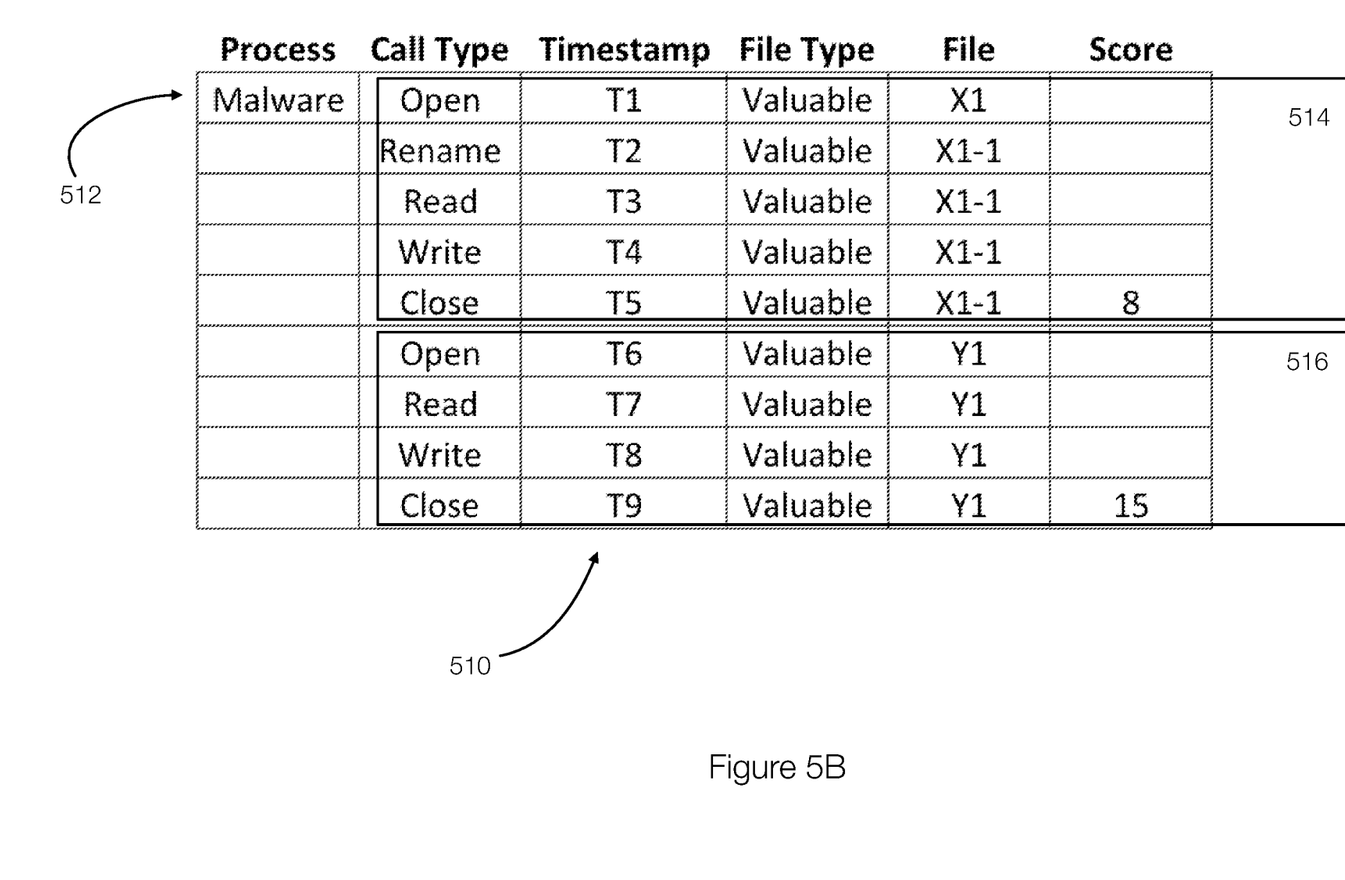
FIG. 5B discloses additional aspects of scoring data used in detecting malware in a computing system.

FIG. 5B discloses additional aspects of scoring for the purpose of detecting malware. In FIG. 5B, a score is not generated until a pattern or a suspected pattern is detected. In FIG. 5B, the table 510 also illustrates system calls associated with a process 512 in a computing system. The pattern 514 does not match a core pattern of open, read, write, and close. Thus, the score is lower than the score for the pattern 516, which matches the core pattern. In this example, the malware detection engine may determine that the core pattern is included in the pattern 514, but give a lower score for that pattern. The scores, in this example, may be enhanced because the system calls were made to valuable files. In addition, the score may be increased due to the fact that a pattern is detected with respect to multiple different files within the time window.

The manner in which the score is generated can vary. In one example, the score of a process is increased when the pattern is completed or when a substantial portion of the pattern is detected or completed. For example, the pattern 514 may not be scored until after the close file is performed. Alternatively, the score for the pattern 514 may be generated after the write file call is detected in the context of the other system calls in the pattern 514.

Figure 6:
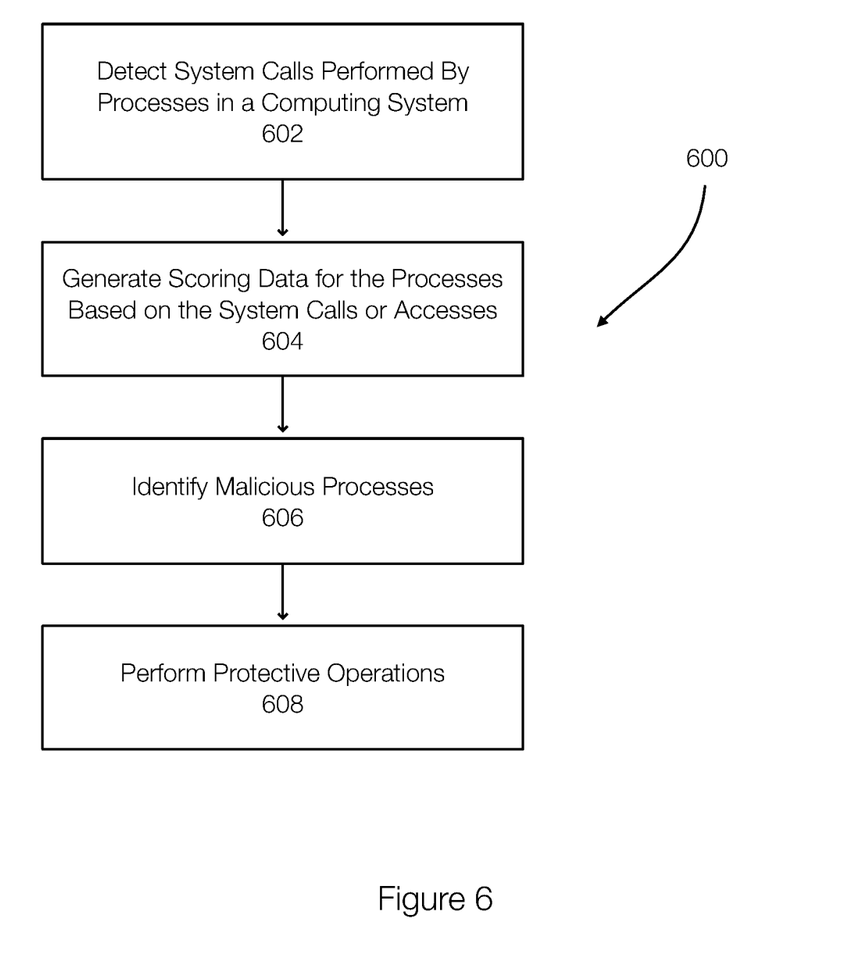
FIG. 6 discloses aspects of a method for detecting malware in a computing system.

FIG. 6 discloses aspects of a method for detecting malware in a computing system. The method 600 includes detecting 602 system calls (accesses) performed by processes operating in a computing system. The malware detection engine may then generate 604 scoring data for each of the processes based on the system calls. The scoring data may be based on a time window, based on type or category being accessed, detected patterns, historical access data (e.g., all accesses in the time window), embedded patterns, patterns to multiple different files, or the like or combinations thereof.

Malicious processes are identified 606 based on the score in the scoring data. When the score of a process exceeds a threshold score, the process is identified 606 as a malicious process (e.g., malware). When a process is determined to be malicious, protective operations 608 are performed.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, malware detection operations, malware response operations, malware deployment operations, file locking operations, kill operations, file kill detection operations, or the like or combinations thereof. Further operations may include data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Power-Protect CyberRecovery and associated data protection software, and storage environments such as the Dell-EMC DataDomain or PowerProtect storage environments. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: monitoring system call patterns to files performed by processes operating in a computing system, generating a score for each process based on the corresponding system call patterns, wherein each score represents a likelihood of the process being a malware process, determining that a process is the malware process when the score of the process exceeds a threshold score, and performing a protective operation in the computing system.

Embodiment 2. The method of embodiment 1, further comprising increasing the score of the process when a core pattern of system call patterns is detected for the process or when a system call pattern that includes the core pattern for the process is detected.

Embodiment 3. The method of embodiment 1 and/or 2, wherein the core pattern includes an open file call, a read file call, a write file call, and a close file call.

Embodiment 4. The method of embodiment 1, 2, and/or 3, further comprising adjusting the score of the process for each system call performed by the process.

Embodiment 5. The method of embodiment 1, 2, 3, and/or 4, wherein the score of each process is based on the system call patterns performed within a time window.

Embodiment 6. The method of embodiment 1, 2, 3, 4, and/or 5, further comprising tracking accesses by associating the accesses of a process while accounting for system calls that cause changes to the files that are not indicative of values of the files.

Embodiment 7. The method of embodiment 1, 2, 3, 4, 5, and/or 6, further comprising categorizing the files based on how the computing system presumes that the malware values the files.

Embodiment 8. The method of embodiment 1, 2, 3, 4, 5, 6, and/or 7, wherein categories include one or more of financial, valuable, personal, confidential, or medical.

Embodiment 9. The method of embodiment 1, 2, 3, 4, 5, 6, 7, and/or 8, where each of the processes is associated with an overall score and a score for each of the categories.

Embodiment 10. The method of embodiment 1, 2, 3, 4, 5, 6, 7, 8, and/or 9, wherein the score of each process is a combination of the overall score and the scores for the categories.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-12.

Embodiment 13. A system comprising a processor and memory configured to perform the operations, methods, or processes, or any portion of any of these, or any combination thereof disclosed herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
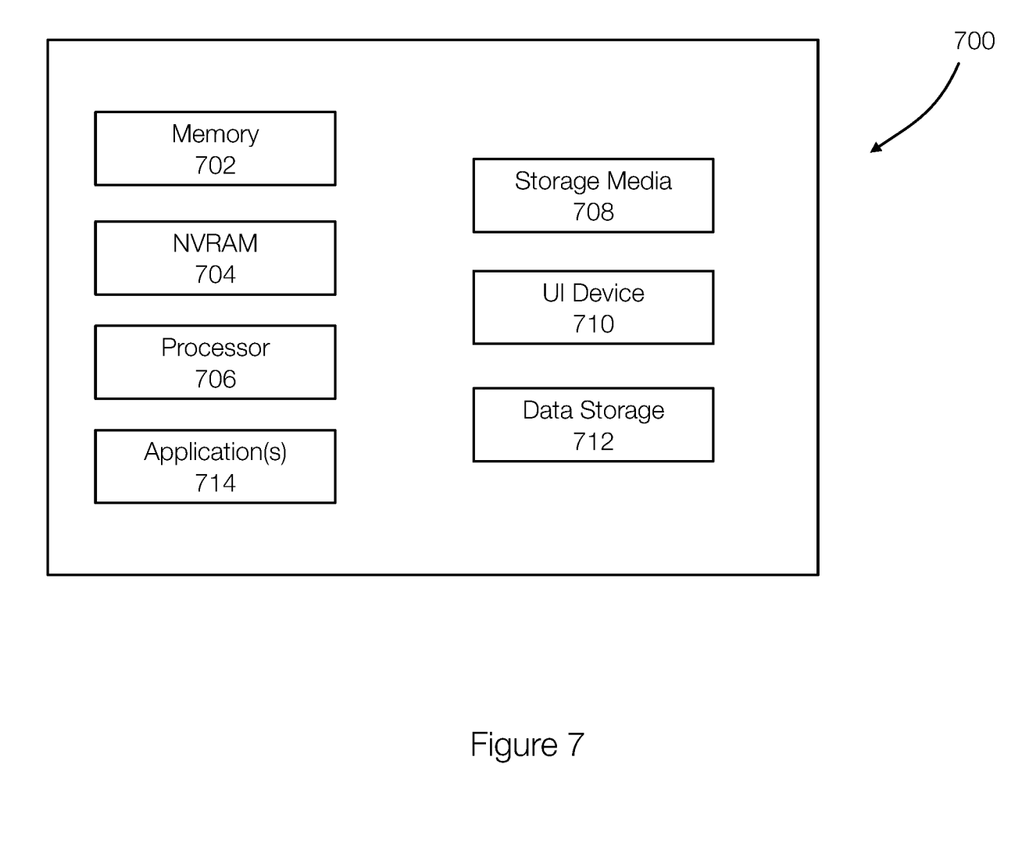
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   labeling files, by a computing system, that are believed to be valuable to a malware process with a valuable label;
   monitoring system call patterns to files performed by a process operating in the computing system, which includes detecting patterns by a model trained with system calls made by known malware, wherein the model is configured to account for pattern variations in the call patterns of processes;
   generating a score for the process based on system call patterns made by the process, wherein each score represents a likelihood of the process being a malware process;
   increasing the score of the process when a core pattern is detected for the process or when a system call pattern that includes the core pattern for the process is detected, wherein the core pattern includes a specified series of system calls;
   increasing the score of the process when a file targeted by the system calls made by the process have the valuable label, wherein the score for the file is different when the file is not labeled with the valuable label;
   determining that a process is the malware process when the score of the process exceeds a threshold score; and
   performing a protective operation in the computing system.

2. The method of claim 1, wherein the series of system calls of the core pattern include an open file call, a read file call, a write file call, and a close file call.

3. The method of claim 1, further comprising adjusting the score of the process for each system call performed by the process.

4. The method of claim 1, wherein the score of the process is based on the system call patterns performed within a time window.

5. The method of claim 1, further comprising tracking accesses by associating the accesses of the process while accounting for system calls that cause changes to the files that are not indicative of values of the files.

6. The method of claim 1, further comprising categorizing the files based on how the computing system presumes that the malware values the files, wherein a first category includes files labeled as valuable.

7. The method of claim 6, wherein categories include one or more of financial, valuable, personal, confidential, or medical.

8. The method of claim 6, where the processes is associated with an overall score and a score for each of the categories.

9. The method of claim 8, wherein the score of the process is a combination of the overall score and the scores for the categories.

10. A non-transitory storage medium having stored therein instructions that are executable by one or more hardware processors to perform operations comprising:
    labeling files, by a computing system, that are believed to be valuable to a malware process with a valuable label;
    monitoring system call patterns to files performed by a process operating in the computing system, which includes detecting patterns by a model trained with system calls made by known malware, wherein the model is configured to account for pattern variations in the call patterns of processes;
    generating a score for the process based on system call patterns made by the process, wherein each score represents a likelihood of the process being a malware process;
    increasing the score of the process when a core pattern is detected for the process or when a system call pattern that includes the core pattern for the process is detected, wherein the core pattern includes a specified series of system calls;
    increasing the score of the process when a file targeted by the system calls made by the process have the valuable label, wherein the score for the file is different when the file is not labeled with the valuable label;
    determining that a process is the malware process when the score of the process exceeds a threshold score; and
    performing a protective operation in the computing system.

11. The non-transitory storage medium of claim 10, wherein the series of system calls of the core pattern include an open file call, a read file call, a write file call, and a close file call.

12. The non-transitory storage medium of claim 10, further comprising adjusting the score of the process for each system call performed by the process.

13. The non-transitory storage medium of claim 10, wherein the score of the process is based on the system call patterns performed within a time window.

14. The non-transitory storage medium of claim 10, further comprising tracking accesses by associating the accesses of the process while accounting for system calls that cause changes to the files that are not indicative of values of the files.

15. The non-transitory storage medium of claim 10, further comprising categorizing the files based on how the computing system presumes that the malware values the files, wherein a first category includes files labeled as valuable.

16. The non-transitory storage medium of claim 15, wherein categories include one or more of financial, valuable, personal, confidential, or medical.

17. The non-transitory storage medium of claim 15, where each of the processes is associated with an overall score and a score for each of the categories.

18. The non-transitory storage medium of claim 17, wherein the score of the process is a combination of the overall score and the scores for the categories.

* * * * *